United States Patent
Barry et al.

(10) Patent No.: US 7,752,072 B2
(45) Date of Patent: Jul. 6, 2010

(54) METHOD AND SYSTEM FOR PROVIDING ADVERTISING THROUGH CONTENT SPECIFIC NODES OVER THE INTERNET

(75) Inventors: Christopher J. Barry, Somers, NY (US); Eric Robert Bronnimann, Astoria, NY (US); Jacob Paul Ewerdt, Lakewood, CO (US); William C. Day, Haworth, NJ (US); Kevin R J B Donovan, White Plains, NY (US); Brian Hammond, New York, NY (US); Elizabeth Klein, New York, NY (US); Matthew Gordon Knell, Staten Island, NY (US); Ron McCoy, Doraville, GA (US); Sara Frances Plath, New York, NY (US); Dan C. Porter, Brooklyn, NY (US); Eric Christopher Saam, Union, NJ (US)

(73) Assignee: Google Inc., Mountain View, CA (US)

( * ) Notice: Subject to any disclaimer, the term of this patent is extended or adjusted under 35 U.S.C. 154(b) by 733 days.

(21) Appl. No.: 10/309,332

(22) Filed: Dec. 4, 2002

(65) Prior Publication Data
US 2004/0015397 A1     Jan. 22, 2004

Related U.S. Application Data

(60) Provisional application No. 60/396,003, filed on Jul. 16, 2002.

(51) Int. Cl.
*G06Q 30/00* (2006.01)
(52) U.S. Cl. .............. 705/14; 705/26; 705/27
(58) Field of Classification Search ............ 706/26, 706/27; 725/26, 27, 14; 705/14, 26, 27
See application file for complete search history.

(56) References Cited

U.S. PATENT DOCUMENTS 3,261,361 A    7/1966   Power (Continued)

FOREIGN PATENT DOCUMENTS

JP     2001-306441     11/2001

(Continued)

OTHER PUBLICATIONS

Sprinks1, PR Newswire, "About.com adds auction-based advertising to platform", Apr. 10, 2000.*

(Continued)

*Primary Examiner*—Mark Fadok
(74) *Attorney, Agent, or Firm*—Fish & Richardson P.C.

(57) ABSTRACT

Methods and systems for providing advertising content over the Internet through a hierarchical content-specific node structure and pricing advertising delivery over each node independently. Independent delivery and pricing allows an advertiser to pay more for advertisements delivered to a narrowly targeted audience likely to be interested in the goods or services offered by the advertising entity and to pay less for advertisements directed at a more general audience who may or may not have an interest in the goods or services offered. The less content specific the node is, the less targeted the advertisement will be, and therefore, the less valuable the advertisement will be to the advertising entity. Targeted advertising to multiple levels of content specific nodes is enabled.

34 Claims, 16 Drawing Sheets

U.S. PATENT DOCUMENTS

| | | |
|---|---|---|
| 5,636,346 A | 6/1997 | Saxe |
| 5,724,521 A | 3/1998 | Dedrick et al. |
| 5,845,265 A | 12/1998 | Woolston |
| 5,918,010 A | 6/1999 | Appleman et al. |
| 5,920,854 A | 7/1999 | Kirsch et al. |
| 5,931,901 A | 8/1999 | Wolfe et al. |
| 5,948,061 A | 9/1999 | Merriman et al. |
| 5,960,409 A | 9/1999 | Wexler |
| 5,974,398 A | 10/1999 | Hanson et al. |
| 6,026,368 A | 2/2000 | Brown et al. |
| 6,044,375 A | 3/2000 | Shmueli et al. |
| 6,061,659 A | 5/2000 | Murray |
| 6,067,570 A | 5/2000 | Kreynin et al. |
| 6,078,866 A | 6/2000 | Buck et al. |
| 6,223,163 B1 | 4/2001 | Van Luchene |
| 6,230,170 B1 | 5/2001 | Zellweger et al. |
| 6,247,009 B1 | 6/2001 | Shiiyama et al. |
| 6,253,189 B1 | 6/2001 | Feezell et al. |
| 6,269,361 B1 | 7/2001 | Davis et al. |
| 6,285,987 B1 | 9/2001 | Roth et al. |
| 6,298,348 B1 | 10/2001 | Eldering |
| 6,324,519 B1 | 11/2001 | Eldering |
| 6,336,132 B2 | 1/2002 | Appleman et al. |
| 6,421,675 B1 | 7/2002 | Ryan et al. |
| 7,035,812 B2* | 4/2006 | Meisel et al. ............. 705/14 |
| 7,062,453 B1* | 6/2006 | Clarke .................... 705/26 |
| 7,225,151 B1 | 5/2007 | Konia |
| 2001/0042064 A1 | 11/2001 | Davis et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0077891 A1 | 6/2002 | Castle et al. |
| 2002/0099605 A1 | 7/2002 | Weitzman et al. |
| 2002/0103698 A1* | 8/2002 | Cantrell ................ 705/14 |
| 2002/0111898 A1 | 8/2002 | Numaoka et al. |
| 2002/0120505 A1* | 8/2002 | Henkin et al. ............ 705/14 |
| 2002/0123988 A1 | 9/2002 | Dean et al. |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0033292 A1* | 2/2003 | Meisel et al. ............. 707/3 |
| 2003/0037334 A1 | 2/2003 | Khoo et al. |
| 2003/0046161 A1* | 3/2003 | Kamangar et al. .......... 705/14 |
| 2003/0055729 A1* | 3/2003 | Bezos et al. ............. 705/14 |
| 2003/0070167 A1 | 4/2003 | Holtz et al. |
| 2003/0083937 A1 | 5/2003 | Hasegawa et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0030741 A1* | 2/2004 | Wolton et al. ............ 709/202 |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Iino et al. |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0249709 A1 | 12/2004 | Donovan et al. |
| 2005/0065806 A1 | 3/2005 | Harik |
| 2005/0071224 A1 | 3/2005 | Fikes et al. |
| 2005/0096979 A1 | 5/2005 | Koningstein |
| 2005/0131758 A1 | 6/2005 | Desikan et al. |
| 2005/0131762 A1 | 6/2005 | Bharat et al. |
| 2005/0144069 A1 | 6/2005 | Wiseman et al. |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |

FOREIGN PATENT DOCUMENTS

| | | |
|---|---|---|
| JP | 2001-306576 | 11/2001 |
| JP | 2002-132830 | 5/2002 |
| JP | 2002-189691 | 7/2002 |
| JP | 2002-189744 | 7/2002 |
| WO | WO 01/13273 | 2/2001 |
| WO | WO 01/15053 | 3/2001 |
| WO | WO 01/33315 | 5/2001 |

OTHER PUBLICATIONS

Sprinks2, PR Newswire, "About, Inc. announces Sprinks distribution with ask Jeeves; Deal demonstrats success of Sprinks in search infrastructure" Sep. 11, 2000.*

Sprinks3, Business Wire, "Did-it.com releases suite of solutions to increase the efficiency of pay-per-click (ppc) search engines", May 1, 2001.*

Sprinks4, Patricia Riedman, "Advertorial seeps into search sites", Advertising Age, Feb. 19, 2001.*

Sprinks5, http://web.archive.org/web/20001109072000/personalweb.about.com/internet/personalweb/, dated Nov. 9, 2000.*

Sprinks6, http://web.archive.org/web/20010405212739/sprinks.about.com/ad_intercept,html, dated Apr. 5, 2001.*

Sprinks7, http://web.archive.org/web/20010119180600/sprinks.about.com/, dated Jan. 19, 2001.*

Sprinks8, http://web.archive.org/web/20010119181200/http://www.sprinks.com, dated Jan. 19, 2001.*

Sprinks9, About.com unveils sponsored links on verticle sites, Adweek, dated Apr. 10, 2000.*

Sprinks10, About.com adds auction-based advertising to platform, PR Newswire, Dated Apr. 10, 2000.*

Sprinks 11, http://webarchive.org/web/200100331040103/sprinks.about.com/professional_advertising.html. dated Mar. 31, 2001.*

Sprinks 12, http://webarchive.org/web/20010331041946/sprinks.about.com/targeted_audiances.html, dated Mar. 31, 2001.*

Sprinks 13, http://web.archive.org/web/20001109072000/personalweb.about.com/internet/personalweb/, dated Nov. 9, 2000.*

Sprinks 14, http://web.archive.org/web/20010331030637/sprinks.about.com/how_it_works.html, dated Mar. 31, 2001.*

Sprinks15, http://web.archive.org/web/20010331023508/sprinks.about.com/ad_intercept.html, dated Mar. 31, 2001.*

Sprinks16 , http://web.archive.org/web/20010331025328/sprinks.about.com/faq.htm, dated Mar. 31, 2001.*

Sprinks 17, "About, Inc. Announces sprinks distribution with Ask Jeeves; deal demonstrates success of sprinks in search infrastructure.", PRNewswire, Sep. 11, 2000.*

Sprinks 18, Mack, Ann, "About.com unveils sponsored links on verticle sites", Adweek, Apr. 2000.*

Google Introduces New Pricing For Popular Self-Service Online Advertising Program, http://www.google.com/press/pressrel/select.html, p. 1-2, printed on Jul. 29, 2003.

Search Overview, http://www.content.overture.com/d/Usm/about/news/searchoverview.jhtml, p. 1-3, printed on Jul. 29, 2003.

Collection of papers from findwhat.com, http://www.findwhat.com/index.asp, printed on Jul. 29, 2003.

Collection of papers from Sprinks.com, http://www.sprinks.com, printed on Jul. 29, 2003.

Collection of papers from Kandoodle.com, http://www.kanoodle.com/about/about.cool, printed on Jul. 29, 2003.

Collection of papers from Google Advertising, http://www.google.com/ads/, printed on Jul. 29, 2003.

Chris Sherman, "Google Launches AdWords Select," Feb. 20, 2002, 6 pages.

* cited by examiner

| SIGN UP 200 |  |
|---|---|
| CREATE USERNAME & PASSWORD | |
| CHOOSE A USERNAME 210 | Advertiser1 |
| ENTER YOUR EMAIL ADDRESS | Ad1@advertiser1.com |
| PASSWORD 220 | ******** |
| CONFIRM PASSWORD 220 | ******** |
| CANCEL | CONTINUE |

Figure 2

| PLACE ADVERTISEMENT USING SEARCH TERM 300 | |
|---|---|
| | |
| ENTER SEARCH TERM 310 | breast bump |
| ENTER LISTING TITLE 320 | B-P breast pumps for sale |
| ENTER DISPLAY URL 330 | www.b-p.com |
| ENTER TARGETED URL 340 | Www.b-p.com\modelB.html |
| ENTER DESCRIPTION 350 | B-P sells the highest quality, safest and most mother-recommended lines of breast bump. |
| SUBMIT PRICING 360 | $0.05 |
| ADD OTHER SEARCH TERMS | |
| CANCEL | SUBMIT & CONTINUE |

Figure 3

| CONFIRM LISTINGS FOR SEARCH TERMS 400 | | | | | | |
|---|---|---|---|---|---|---|
| # | SEARCH TERM 310 | TITLE 320 | URL 330 | PRICE 360 | RANK 410 | |
| 1 | Breast bumps | B-P breast pumps for sale | www.b-p.com | $0.05 | 4 | EDIT |
| 2 | | | | | | EDIT |
| 3 | | | | | | EDIT |
| 4 | | | | | | EDIT |

CANCEL                                CONFIRM & CONTINUE

Figure 4

PLACE ADVERTISEMENT ON LEVEL NODES

CHOOSE CATEGORIES BASED UPON KEYWORD 510

- [ ] ALL SUGGESTED CATEGORIES
- [ ] PREGNANCY
- [ ] PARENTING
- [ ] BREASTFEEDING
- [ ] PREGNANCY/BIRTH
- [ ] POST PARTUM

| CHANNEL LEVEL NODES 520 | SUBJECT LEVEL NODES | DOCUMENT LEVEL NODES |
|---|---|---|
| ☐ ARTS & ENTERTAINMENT | | |
| ☐ AUTOMOTIVE | | |
| ☐ COMPUTING & TECHNOLOGY | | |
| ☐ EDUCATION | | |
| ☐ HEALTH & FITNESS | | |
| ☐ HOUSE & HOME | | |
| ☐ JOBS & CAREERS | | |
| ☐ MONEY | | |
| ☐ PARENTING & FAMILY | | |

[ CANCEL ]　　　　　　　　　　　　[ SAVE & CONTINUE ]

Figure 5

PLACE ADVERTISEMENT ON LEVEL NODES

CHOOSE CATEGORIES BASED UPON KEYWORD 610

- [ ] ALL SUGGESTED CATEGORIES
- [ ] PREGNANCY
- [ ] PARENTING
- [ ] BREASTFEEDING
- [ ] PREGNANCY/BIRTH
- [ ] POST PARTUM

| CHANNEL LEVEL NODES | SUBJECT LEVEL NODES 620 | DOCUMENT LEVEL NODES |
|---|---|---|
| [X] PARENTING & FAMILY | [ ] ADOPTION<br>[ ] DAYCARE/PRESCHOOL<br>[ ] FATHERHOOD<br>[ ] PREGNANCY/BIRTH<br>[ ] SINGLE PARENTS<br>[ ] STAY-AT-HOME PARENTS<br>[ ] PARENTING SPECIAL NEEDS<br>[ ] PARENTING: BABIES & TODDLERS | |

[ CANCEL ]                                        [ SAVE & CONTINUE ]

Figure 6

PLACE ADVERTISEMENT ON LEVEL NODES — 700

CHOOSE CATEGORIES BASED UPON KEYWORD 710

- [ ] ALL SUGGESTED CATEGORIES
- [ ] PREGNANCY
- [ ] PARENTING
- [ ] BREAST FEEDING
- [ ] PREGNANCY/BIRTH
- [ ] POST PARTUM

| CHANNEL LEVEL NODES | SUBJECT LEVEL NODES | DOCUMENT LEVEL NODES 720 |
|---|---|---|
| [X] PARENTING & FAMILY | [X] PREGNANCY/ BIRTH | [ ] GETTING PREGNANT<br>[ ] SIGNS & SYMPTOMS<br>[ ] PREGNANCY<br>[ ] PRENATAL TESTS<br>[ ] LABOR & BIRTH<br>[ ] POST PARTUM<br>[ ] YOUR BABY<br>[ ] BREAST FEEDING<br>[ ] PREGNANCY LOSS |

[CANCEL]   [SAVE & CONTINUE]

PLACE ADVERTISEMENT ON LEVEL NODES

CONFIRM LISTINGS

- [X] PREGNANCY
- [X] LABOR & BIRTH
- [X] POST PARTUM
- [X] YOUR BABY
- [X] BREAST FEEDING

UNCHECK THE CATEGORIES THAT YOU DO NOT WANT AND CLICK 'UPDATE CHANGES' BEFORE SAVING.

UPDATE CHANGES

CANCEL     SAVE & CONTINUE

Figure 8

| PLACE ADVERTISEMENT ON LEVEL NODES | |
|---|---|
| LISTING 910: PARENTING & FAMILY/PREGNANCY/BIRTH/BREAST FEEDING | |
| ENTER LISTING TITLE 920 | B-P breast pumps for sale |
| ENTER DISPLAY URL 930 | www.b-p.com\modelB |
| ENTER TARGETED URL 940 | www.b-p.com\modelB |
| ENTER DESCRIPTION 950 | Purchase now ... limited time offer on B-P breast pumps. |
| SUBMIT PRICING 960 | $0.12 |
| CANCEL | SUBMIT & CONTINUE |

Figure 9

CONFIRM LISTINGS

PLACE ADVERTISEMENTS ON LEVEL NODES — 1000

| # | CATEGORY | TITLE | URL | BID | RANK 1020 | |
|---|---|---|---|---|---|---|
| 1 | PREGNANCY | BREAST PUMPS | www.b-p.com | $.10 | 2 | EDIT |
| 2 | LABOR & BIRTH | BREAST PUMPS | www.b-p.com | $.08 | 2 | EDIT |
| 3 | POST PARTUM | BREAST PUMPS | www.b-p.com | $.02 | 3 | EDIT |
| 4 | YOUR BABY | BREAST PUMPS | www.b-p.com | $.05 | 5 | EDIT |
| 5 | BREAST FEEDING | BREAST PUMPS | www.b-p.com | $.15 | 1 | EDIT |

1010

CANCEL     CONFIRM & CONTINUE

Figure 10

| SIGN UP | |
|---|---|
| PROVIDE CONTACT INFORMATION 1100 | |
| FIRST NAME 1110 | John |
| LAST NAME 1120 | Advertiser |
| COMPANY NAME 1130 | Advertiser1.com |
| STREET ADDRESS 1140 | 100 Advertiser Way |
| CITY 1150 | AdVille |
| STATE 1160 New York | ZIP 1170 55555 |
| COUNTRY 1180 | USA |
| YOUR PRIMARY EMAIL ADDRESS 1190 | john@advertiser1.com |
| PHONE NUMBER 1115 | 555-555-5555 |
| FAX NUMBER 1125 | 555-555-5556 |
| INDUSTRY 1135 | Consumer Health |
| CANCEL | SAVE & CONTINUE |

Figure 11

| | |
|---|---|
| SIGN UP | |
| PROVIDE BILLING INFORMATION 1200 | |
| CREDIT CARD INFORMATION | |
| CARD TYPE | VISA |
| CARD NUMBER 1210 | 5555-5555-5555-5555 |
| EXPIRATION DATE | 12    05 |
| SECURITY CODE (IF APPLICABLE) | 989 |
| ACCOUNT AUTO-REPLENISH | |
| SIGN ME UP FOR AUTO-REPLENISH 1220 | [X] |
| WHEN MY ACCOUNT BALANCE REACHES 1240 | $ 500.00 |
| CHARGE MY CARD FOR THIS AMOUNT 1230 | $ 500.00 |
| BILLING ADDRESS 1250 | |
| [X] SAME AS MY CONTACT ADDRESS | |
| FIRST NAME | John |
| LAST NAME | Advertiser |
| STREET ADDRESS | 100 Advertiser Way |
| CITY | AdVille |
| STATE   New York    ZIP | 55555 |
| COUNTRY | USA |
| CANCEL | SAVE & CONTINUE |

Figure 12

| ACCOUNT REGISTRATION SUMMARY 1300 | |
|---|---|
| YOU SIGNED UP FOR THE FOLLOWING: | |
| (#) SEARCH ITEMS 1310 | EDIT |
| (#) NODE LEVEL LISTINGS 1310 | EDIT |
| CONTACT INFORMATION 1320 | John Advertiser<br>Advertiser1.com<br>100 Advertiser Way<br>AdVille, New York 55555<br>USA<br>PH 555-555-5555<br>FA 555-555-5556 |
| | EDIT |
| BILLING INFORMATION 1330 | |
| CREDIT CARD: VISA 5555-5555-5555-5555 EXP 12/05 | EDIT |
| AUTO-REPLENISH IS ACTIVE | EDIT |
| BILLING ADDRESS | 100 Advertiser Way<br>AdVille, New York<br>55555 |
| | EDIT |
| CANCEL | REGISTER |

Figure 13

| http://www.about.com\parenting\pregnancy\breast | 1510

Parenting & Family 1520: Pregnancy & Birth 1530: Breastfeeding 1540:

```
The Benefits to Breastfeeding Your Children
           by Dr. John Doc
```
_1550

1570 { 1. B-P breast pumps for sale (1555): Purchase now ...
       limited time offer on B-P breast pumps. (1560)
       (www.b-p.com\modelB) (1565). *[12 ¢ per click-through]*

1580 { 2. What to Expect When You're Expecting: The authority for
       expecting parents. (www.amazon.com). *[10 ¢per click-through]*

1590 { 3. The Fastest Breast Pumps: Consumer Reports rates Hungry
       Breast Pumps as the highest quality and best value.
       (www.hungrybreastpumps.com). *[9 ¢ per click-through]*

Figure 15

| http://www.about.com\parenting\pregnancy\getting | 1610

Parenting & Family 1620: Pregnancy & Birth 1630: Getting Pregnant 1640:

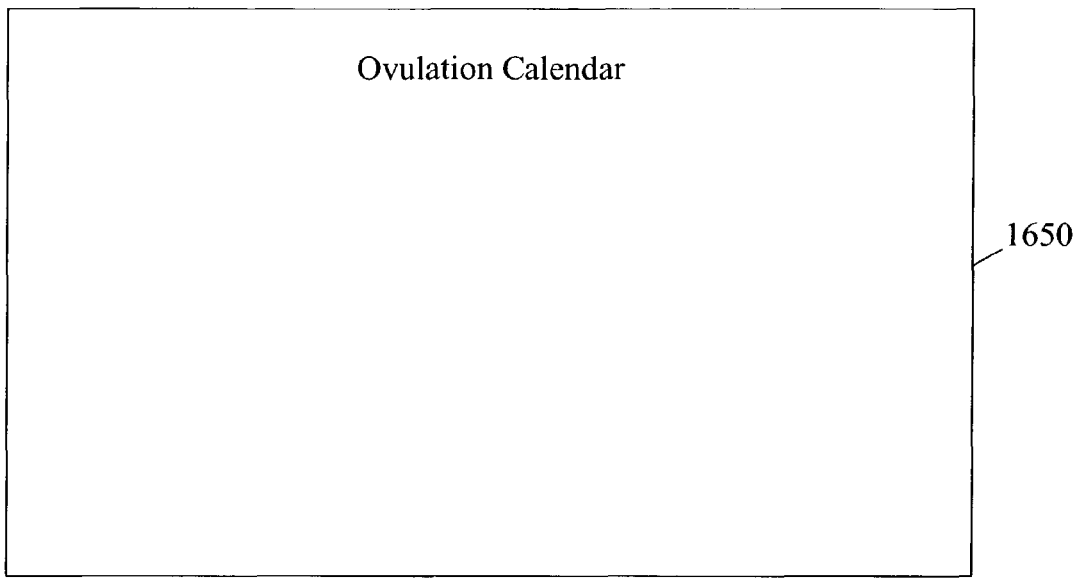

1650

1670 { 1. A Woman's Guide to Fertility (1655): Try these home remedies for infertility. (1660) (www.fertility.com) (1665). *[10 ¢ per click-through]*

1680 { 2. What to Expect When You're Expecting: The authority for expecting parents. (www.amazon.com). *[9 ¢per click-through]*

1690 { 3. B-P Breast Pumps for Sale: Purchase now ... limited time offer on B-P breast pumps. (www.b-p.com). *[3 ¢ per click-through]*

Figure 16

METHOD AND SYSTEM FOR PROVIDING ADVERTISING THROUGH CONTENT SPECIFIC NODES OVER THE INTERNET

RELATED APPLICATIONS

This application claims priority from a provisional patent application filed on Jul. 16, 2002, entitled "Method and system for providing advertising through content specific nodes over the Internet" and having U.S. Application No. 60/396,003.

FIELD OF THE INVENTION

This invention relates to systems for and methods of providing targeted advertising over a distributed content-based system of coordinated content-specific nodes over the Internet.

BACKGROUND OF THE INVENTION

Targeted advertising has long been a goal of the companies who place and pay for advertisements. Advertisements can be expensive in any medium. Thus, companies generally would like to pay only for advertisements that will be viewed by a group of individuals likely to be interested in that company's goods or services.

Over the Internet, one form of advertisement is a paid placement for a search result in a search engine. In these systems, advertisers may choose to offer a different amount for having an advertisement listed in search results for a specific search term and the search results returned by the search engine will be ranked among the advertisers who offer an amount for a particular search term according to the amount offered. For example, if a consumer searched on a paid listing search engine for "airline tickets," a list of airlines is generated with corresponding URL listings so that the consumer can click on a listing and go to the website corresponding to that listing. Each advertiser associated with those listings pays the search engine a certain amount of money for every "click-through" to the advertiser's website. The higher an advertiser's name appears on the list of search results, the more likely a user will click-through to that advertiser's provided URL (e.g., it's website). Often, as the cost per click-through for the advertising company increases, the closer that company's listing is to the top of the list of search results.

While the aforementioned existing systems allow for some targeting of advertising money, such systems fail to provide other targeted advertising avenues over the Internet.

These and other drawbacks exist with current systems.

SUMMARY OF THE INVENTION

Embodiments of the present invention relate to a system of mapping Internet content areas (content nodes) at various levels with advertising specific to the subject matter of the content node. The system provides a mechanism for allowing advertising users to place advertisements through an interface that allows the advertiser to select at least two different levels of content nodes from a dynamic and editorial controlled hierarchy with the intent of placing advertisements for inclusion in those content nodes. The interface enables an advertiser to bid for placement of the advertisement within a bid-for-placement advertisement system within the content node and allows the advertiser to specify different bid amounts at different levels of specificity. For example, in a system that provides five node levels, the advertiser might bid $0.10 per click through for placement on every content node in the system, $0.12 per click through for placement of its advertisement on one of several second-level nodes, $0.15 per click through for placement of its advertisement on one of several third-level nodes, $0.17 per click through for placement of its advertisement on one of several fourth-level nodes, and $0.25 per click through for placement of its advertisement on one of several fifth-level nodes based on the content of the nodes selected and its nexus to the advertisement being placed. By enabling an advertiser to specify a bid for placement and providing greater specificity at different levels of granularity, the advertiser is able to self-select the most beneficial advertising campaign by monitoring performance of its advertisements at different levels of details. As a result, it can increase or decrease its bid amount at the different levels to provide the most cost-effective advertising system.

The content nodes are then mapped by the system with participating content providers in a manner that gives the viewers of the content nodes a contextual view of advertisements. The system stores and maintains the relationships an advertiser has mapped between content nodes and advertisements.

In one embodiment of the present invention, the system maps requests for placement from advertisers into a hierarchy of content nodes in an increasing level of targeting from a general level down to a specific web page, depending on the selections by the advertiser. Content nodes may be specific Internet content or any grouping of such content, including web pages, newsletters, chat, newsgroups, or any derivative of such. Content nodes may have Titles, Descriptions, Depth Levels, Rules, and possible relationships with other content nodes as either a parent or a child depending on the depth.

The Title of the content node may be a short descriptor meant to identify the type of information or communications the content area contains. Conceptually the titles of any parent nodes may also be part of the node title descriptor. For example, a content node with a title of "Vitamins" under a parent content node of "Pets" is different from a content node with a title of "Vitamins" under a parent node of "Health." In a preferred embodiment, the titles may be shorthanded in a directory-like nomenclature, such as "Pets/Vitamins" and "Health/Vitamins."

The description of the content node is a long descriptor meant to aid in identifying to the advertiser the specifics of where an ad listing mapped to that content node might appear.

As the depth level of a content node increases, so does the targeting of interests of the user audience. By convention, given depths are referenced with specific names but the nomenclature and number of depths with specific names is variable and defined by the specifics and granularity of content available from distributors.

Rules may be understood to be an abstraction of any business rules that might apply to mapping an ad listing to that given content node. For example, for a newsletter content node, the system may implement a rule requiring an advertiser to have at least $2000 in their account to list an ad on that newsletter content node. Rules may also enforce minimum purchase prices, such as $0.05 per click, if sold on a cost per click. Rules may also allow for inheritance from parent nodes. For example, a given content node may not be allowed to be mapped on a cost per click that is less than or equal to the cost per click on the parent node.

A content node has definable relationships to other content nodes: whether it has a parent, children, or sibling content nodes. It is worth noting that content nodes at the same depth may have different sets of relationships. For example, two sibling content nodes (content nodes with the same parent content node) may or may not independently have children. Note this can and will make for possible asymmetrical content node hierarchies.

Conceptually, a top-level root content node exists which simply translates into a generic request for placement that is not targeted to any specific Internet content other than language (i.e., English language). The top-level node allows advertisers to target a generic audience on the Internet. Ad listings mapped at the top level may appear on the homepage of sites such as msn.com, yahoo.com, and about.com at the same time. Top-level content nodes have no parent.

A channel level node may be understood to be a targeted, but somewhat general, content area. It is used in content areas where the most rudimentary interest is known but not the specifics of it. An example of a channel level node may be "Parenting & Family." In this case the content area indicates a user has a general interest in parenting or family but no more is known. Channel level content nodes have a top level node, and may further have sibling nodes and child nodes.

A subject matter level node may be understood to be a targeted content area. It is used in Internet content areas where a specific interest is known. An example of a subject matter level node is "Parenting & Family/Pregnancy & Birth" where "Pregnancy & Birth" is the title of the subject matter level node and "Parenting & Family" is the title of the parent, channel level node. In this case, the content on the subject matter level node is designed for users who have a specific interest in "Pregnancy & Birth." An advertiser mapping to this content node may desire to place an advertisement on the subject matter level content node to be viewed by end users accessing that subject matter level content node. Subject matter level content nodes have a parent node and may also have sibling nodes and child nodes.

A document level node is defined as the most targeted of content units in this embodiment. The document level is used in targeting a specific piece of content that is truly unique. An example of a document level content node is targeted to a specific URL, or a specific newsletter mailing only. An example of a document level node is "Parenting & Family/Pregnancy & Birth/Breastfeeding" where "Breastfeeding" is the actual title of the document level content node, "Pregnancy & Birth" is the actual title of the of the parent, subject matter content node, and "Parenting & Family" is the title of the channel level content node. An advertiser mapping to this content node might desire advertising on the Breastfeeding pages contained at pregnancy.about.com site, as an example. Document level content nodes may be such that they do not have children, but may have siblings or parents.

Clearly, in other embodiments, there may be additional levels of nodes with additional specificity regarding the content. This system which allows for placement of advertisements over nodes with varying levels of content specificity enables an advertiser to offer a higher amount for advertisements where the audience is likely to be persons interested in purchases the goods or services advertised. Additionally, the advertiser may also place an advertisement where the content is more tangentially related to the goods and services being offered, and thus less likely to generate sales. This allows the advertiser more flexibility in offering to place advertisements, which enables the advertiser to more specifically target its audience. Generally, the more an advertisement is targeted to viewers likely to become buyers, the more value the advertiser gets for its advertising dollar. The present invention also has the advantage of allowing the advertiser to disseminate its advertisements broadly, or without targeting. The advertiser may offer a lower amount for this untargeted advertising, though, since it is less likely to generate sales.

An Internet advertising system for receiving advertisement information from advertisers for publication through a multi-node hierarchical content-based system, the Internet advertising system has an interactive database server that receives advertisement listing information from a plurality of advertiser user systems connecting to the Internet advertising system over the Internet, the advertisement listing information comprising an advertisement title and URL, a selection of one or more node levels with which the advertisement listing information is to be associated, and a bid amount for each node level selected, a database that stores the advertisement listings, and a network file server that delivers web page content and advertisement listings to a plurality of end users requesting nodes in the multi-node hierarchical system, the content and advertisement listings delivered being based on the node selected by an end user. The URL provided may specify the target web page to be delivered to the end user upon selection of the advertising listing from the web page delivered to the end user. A network file server may deliver advertisement listings for a specific requested node and may do so based on a ranking of advertisement listings associated with the particular node as well as the advertising listings for higher-level nodes. To maintain quality control and ensure some relationship between the advertisement listing and the node with which an advertiser seeks to have it associated, the system may further provide a set of rules applicable to the Internet advertising system to be applied by a rule checking module that determines whether the offered advertisement complies with the set of rules, and if not, provides that information to a denial transmission module that transmits a refusal to any desired advertisement that fails to comply with the set of rules.

The accompanying drawings, which are incorporated in and constitute a part of this specification, illustrate various embodiments of the invention and, together with the description, serve to explain the principles and advantages of the invention.

BRIEF DESCRIPTION OF THE DRAWINGS

FIG. 2 is a screenshot representing a step of signing up according to an embodiment of the present invention.

FIG. 3 is a screenshot representing a step of listing an advertisement on the internet associated with a search term according to an embodiment of the present invention.

FIG. 4 is a screenshot representing a confirmation step of listing an advertisement on the internet associated with a search term according to an embodiment of the present invention.

FIG. 5 is a screenshot representing a channel level node selection step of listing an advertisement on level nodes according to an embodiment of the present invention.

FIG. 6 is a screenshot representing a subject level node selection step of listing an advertisement on level nodes according to an embodiment of the present invention.

FIG. 7 is a screenshot representing a document level node selection step of listing an advertisement on level nodes according to an embodiment of the present invention.

FIG. 8 is a screenshot representing a confirm listings step of placing an advertisement on level nodes according to an embodiment of the present invention.

FIG. 9 is a screenshot representing an enter detailed listing step of placing an advertisement on level nodes according to an embodiment of the present invention.

FIG. 10 is a screenshot representing a confirm bids step of listing an advertisement on level nodes according to an embodiment of the present invention.

FIG. 11 is a screenshot representing a provide contact information step of listing an advertisement on level nodes according to an embodiment of the present invention.

FIG. 12 is a screenshot representing a provide billing information step of listing an advertisement on level nodes according to an embodiment of the present invention.

FIG. 13 is a screenshot representing a step of registering an account in order to list an advertisement on level nodes according to an embodiment of the present invention.

FIG. 15 is a screenshot representing advertisements listed in a subject matter specific node within a structure of subject matter specific nodes according to the present invention.

FIG. 16 is a screenshot representing advertisements listed in a subject matter specific node within a structure of subject matter specific nodes according to the present invention.

DETAILED DESCRIPTION OF THE PREFERRED EMBODIMENTS

An advertising system is provided that allows an advertiser to place different bid amounts at different levels of a multi-level hierarchical structure of content specific nodes. This advertising system enables an advertiser to customize its bidding and expenditures within a content-based system, although the user may bid on keyword-based advertising as well, as explained below. For purposes of context, an example of a hierarchical structure of content nodes is depicted in FIG. 1, although this is not intended to be exclusive of the type of hierarchical system for which embodiments of the present invention may be applicable.

Figure 1:
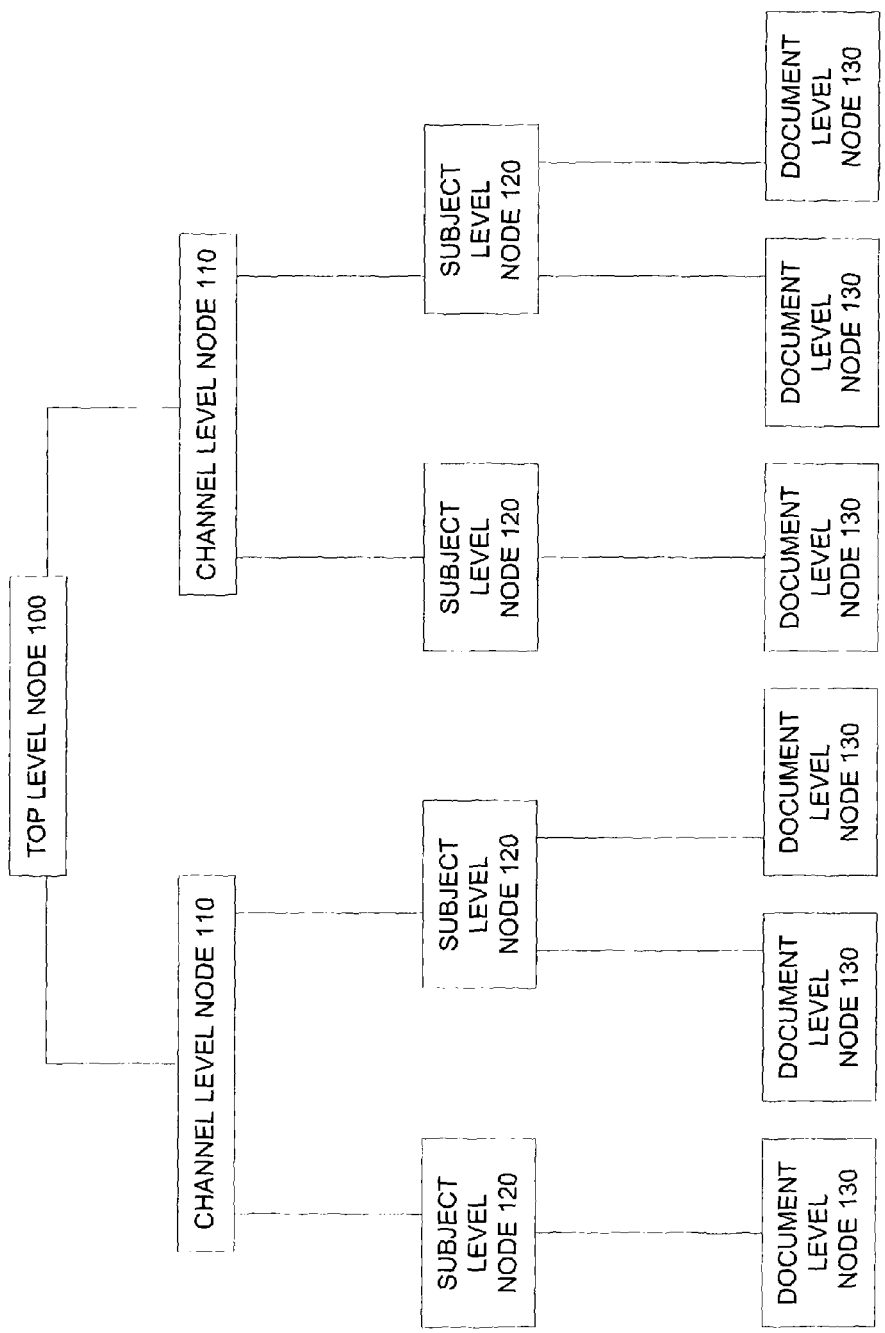
FIG. 1 is a diagram of a hierarchical structure of content nodes according to one embodiment of the present invention.

According to the embodiment depicted in FIG. 1, the top level node 100 may correspond to a level of specificity such as the language of the text on the website. For example, an advertiser that sells basketballs may choose the top level node of English from among top level nodes English, Chinese, and Spanish because ads for basketballs on pages in the English language field of content may be judged more likely to generate a sale to viewers of the ad than to viewers of pages in the Chinese language. It should be appreciated, as described later, that an advertiser may advertise at all top-level nodes, with different bids for each level. In general, though, the user who wishes to advertise on one or more content level nodes may select a top level node 100 for each listing. For example, it may be desirable for the system to always only list ads in the same language as the content on a page. So, the system may prompt an advertiser to select one top level node 100, or the language of the ad, for each listing.

After selecting a top level node 100, and based upon that selection, the user who wishes to more specifically target its audience on one or more content nodes may choose channel level nodes 110 which specify further the subject matter of the desired listing. For example, the advertiser that sells basketballs may choose the channel level node 110 of Sports from among channel level nodes 110 of Sports, Health, Entertainment, and Religion because ads for basketballs on pages with Sports content are more likely to be relevant to viewers of those pages than to viewers of pages with Religion content. The advertiser may also desire to list its ad in Health as well, in order to be seen by recreational basketball players. Although, the advertiser may judge that an ad placed with Health content is likely to draw fewer viewers to click-through. So the advertiser may offer a smaller amount to place an ad on a page with Health content than the amount the advertiser offered for placement on a page with Sports content.

Furthermore, after selecting a channel level node 110 and based upon that selection, the advertiser who wishes to further target its audience using coordinated content-specific nodes may choose a subject level node 120 which specifies further the subject matter of the desired listing and even further, a document level node 130. For example, the advertiser that sells basketballs may choose a subject level node 120 of Basketball from among subject level nodes 120 of Football, Baseball, Basketball, and Soccer. Moreover, the advertiser may further target its audience by choosing a document level node 130 of Equipment from among document level nodes 130 of NBA, WNBA, NCAA, Rules, Statistics, and Equipment. Accordingly, the advertiser may offer a higher amount for placement as the first listing on the Equipment document level node than on the Rules document level node because the advertiser may judge that a user viewing content related to basketball equipment is more likely to be interested in purchasing basketballs than a user viewing content related to the rules of basketball.

Also, the advertiser may desire the first placement on all document level nodes 130 with a subject level node 120 of Basketball. The advertiser may place an offer for that subject level node according to an embodiment of the present invention. Thus, an advertising system is provided that allows an advertiser to place different bid amounts at different levels of a multi-level hierarchical content-based system.

According to the embodiment of the invention illustrated in FIG. 1, the document level node 130 may be the most specific level within the hierarchical structure. However, any number of additional levels of specificity may exist between the top level node 100 and the document level node 130. According to an embodiment of the present invention, once the listing is established the listing may be stored in a relational database with a corresponding directory. Other database structures may also be used as would be appreciated by those in the art, including object-oriented databases, flat files, linked lists and other forms of storage.

For example, if the advertiser who wishes to sell basketballs places the highest amount as an offer for ad placement on the Equipment document level node 130, the Basketball subject level node 120, the Sports channel level node 110, and the English language top level node 100, the listing may be stored as "English\Sports\Basketball\Equipment\1" in a database (e.g., relational database). The advertiser may select the subject matter, or node, levels shown in FIG. 1 by completing the steps shown in FIGS. 2 through 13.

FIG. 2 is a screenshot representing an embodiment of a graphical user interface enabling a user to take the step of "signing up" 200 according to an embodiment of the present invention. An advertiser user desiring to place an advertisement in the multi-node content hierarchical system may access an advertising system graphical user interface of FIG. 2 via a secured Internet connection. The graphical user interface of FIG. 2 may enable any number of advertising users to initiate, manage, and modify advertisements they place on the hierarchical system. FIG. 2 enables an advertising user to input a username 210 and password 220 to create a safe and secure system. Although username/password is shown, other authentication techniques may also be required, including the use of cookies, IP address verification, Pubic Key Infrastructure (PKI) authentication, encryption, and any other security measure usable today.

In addition to providing a secure method of gaining access, the advertisement system may also allow an advertiser to offer to pay an amount for placement of an ad when an end user enters certain, enumerated search terms through a search feature of the multi-node hierarchical content-based system. This step may be in addition to placing an ad using the content-based hierarchical system of nodes. FIG. 3 is a screenshot representing an embodiment of a graphical user interface enabling a user to take the step of "placing an advertisement on the Internet associated with a search term" 300 according to an embodiment of the present invention. A user may be enabled to input a general search term 310, representing a highest level subject matter corresponding to the desired advertisement. Furthermore, the advertiser user enter a listing title 320 for the advertising to be listed. The listing title may represent the title the user desiring advertising wishes to display on the advertisement. For example, if the user desiring advertising wishes to sell breast pumps manufactured by a company under the name of "B-P" the listing title may be "breast pumps for sale" or "B-P breast pumps for sale" or other descriptive alternates. The advertising user may also input a display URL 330, which may represent the location of the general website for the click through. For example, the B-P user may input a display URL 330 of www.b-p.com. Also, the advertising user may input a targeted URL 340, which may represent the actual URL of the site the end-user will be directed to if they click on the advertisement. The targeted URL may differ from the display URL 330, for example, by specifying the exact location of a page to be retrieved for the end-user if the end-user selects the advertisement, and it may refer to the page of a particular model breast pump on sale (e.g., www.b-p.com\modelB.html). In another embodiment, only a single URL is input and the same URL that is displayed is the URL of the site the end-user may be used as the target URL upon selection of the advertisement by an end-user in the multi-node hierarchical content-based system. In the present embodiment, the user desiring advertising may also input a description of the goods or services being advertised 350. Further, the user desiring advertising may submit a price 360. In one embodiment of the present invention, the pricing of the advertisements is accomplished via a bidding system. Each proposed advertisement listing has a bid price associated with it. In this embodiment, listings are subsequently listed in descending order of bid prices for the specific level being displayed. The prices may be a per click through price or a flat rate. The proposed listing as input in this step of the process may be seen by the end user in the proper order when the end user searches the web site for the search term or terms.

The advertisement system may also allow an advertiser to verify an ad listing entered and its corresponding amount offered in a confirmation step. This step may be in addition to placing an ad using the content-based hierarchical system of nodes. This step may also allow the advertiser to see how the amount offered compares with amounts offered by other advertisers. FIG. 4 is a screenshot representing an embodiment of a graphical user interface enabling an advertiser to take the "confirmation step of listing an advertisement on the Internet associated with a search term" 400. This step allows the user desiring advertising to see what position their ads will hold in the descending order of advertisements based upon the pricing previously submitted, also referred to as the ad's rank 410. If the user desiring advertising is not satisfied with the rank 410 shown, or otherwise desires to change anything associated with the ad listing, the user may accomplish this by choosing the edit button 420 associated with that particular listing.

Subsequently, the advertisement system may allow an advertiser to choose a high level subject matter where the advertiser would like to have an ad appear on pages with content on that general subject matter. FIG. 5 is a screenshot representing an embodiment of a graphical user interface enabling a user to take the "channel level node selection" step 500 of listing an advertisement on level nodes according to the present invention. In this step the system may use the search terms previously entered to suggest document level nodes 510. This option may be accomplished under "Choose Categories Based Upon Keyword." Alternatively, the user desiring advertising may specify a category appropriate to the goods or services advertised under Channel Level Nodes 520. Continuing the example of the breast pump manufacturer desiring advertising, the user may select "Parenting and Family" as the Channel Level Node. The screenshot shows sample general subject matters. This list is not meant to be all inclusive. Any other subject matter topic may be appropriate.

Furthermore, the advertisement system may allow an advertiser to select a narrower subject matter where the advertiser would like to have an ad appear on pages with content on that same subject matter. FIG. 6 is a screenshot representing an embodiment of a graphical user interface enabling an advertiser to take the "subject level node selection" step 600 of listing an advertisement on level nodes according to the present invention. At 610, the system may use the search terms previously entered to again suggest document level nodes. This option may be accomplished under "Choose Categories Based Upon Keyword." Also, the user desiring advertising may specify a category appropriate to the goods or services advertised under Subject Level Nodes at 620. Continuing the example of the breast pump manufacturer desiring advertising, the user may select "Pregnancy/Birth" as the Subject Level Node. The screenshot shows sample subject levels. This list is not meant to be all inclusive. Any other subject matter topic may be appropriate as long as it is more specific than the subject matters listed as channel level nodes. The listing options that appear under the subject level nodes 620 depend upon what selection the user desiring advertising made under the channel level node 520.

Moreover, the advertisement system may allow an advertiser to select a still narrower subject matter where the advertiser would like to have an ad appear on pages with content on that same subject matter. FIG. 7 is a screenshot representing an embodiment of a graphical user interface enabling an advertiser to taker the "document level node selection" step 700 of listing an advertisement on level nodes according to the present invention. In this step the system may use the search terms previously entered to suggest document level nodes 710. This option may be accomplished under "Choose Categories Based Upon Keyword." Alternatively, the user desiring advertising may specify a category appropriate to the goods or services advertised under Document Level Nodes 720. Continuing the example of the breast pump manufacturer desiring advertising, the user may select "Breastfeeding" as the Document Level Node. The screenshot shows sample general subject matters. This list is not meant to be all inclusive. Any other subject matter topic may be appropriate as long as it is more specific than the subject matters listed as subject level nodes. The listing options that appear under the document level nodes 720 depend upon what selection the user desiring advertising made under the subject level node 620.

Once the advertisement system has allowed an advertiser to sufficiently define at least one node within a hierarchical subject matter structure where the advertiser seeks to place ads, the system may allow the advertiser to verify that hierarchical subject matter structure. FIG. 8 is a screenshot representing an embodiment of a graphical user interface enabling an advertiser to take the "confirm listings" step 800 of placing an advertisement on level nodes according to the present invention. If listings appear that the user desiring advertising does not wish to purchase, the user may delist them by unchecking the corresponding box, or return and edit the hierarchical structure for a listing.

Additionally, the advertisement system may allow an advertiser to enter information detailing the items of information to be placed in ads the advertiser is attempting to list on the advertisement system. FIG. 9 is a screenshot representing an embodiment of a graphical user interface enabling advertiser to complete the "enter detailed listing" step 900 of placing an advertisement on level nodes according to an embodiment of the present invention. This step must be accomplished for each desired document level node listing. In the preferred embodiment the relational structure of the nodes chosen is represented in the listing name shown at the top of the screenshot 910. The user may then input a listing title 920, a display URL 930, a targeted URL 940, a description 950 and a price 960. It is understood that various other information may be listed in an ad and that these items of information are not meant to be exclusive of other items of information.

Furthermore, the advertisement system may enable the advertiser to check the items of information entered thus far for accuracy, or otherwise give the advertiser an opportunity to adjust the hierarchical structure, or the amount offered on any given listing entered prior to this step. FIG. 10 is a screenshot representing an embodiment of a graphical user interface enabling an advertiser to take the "confirm bids" step 1000 of listing an advertisement on level nodes according to the present invention. Once the step represented in FIG. 9 is accomplished for each desired document level node listing, the listings may be displayed on the screen. Along with the information input by the user desiring advertising 1010, the system may also display the rank 1020 the user would occupy with the price previously submitted for each listing. This step shows the benefits of the present invention. For example, the breast pump manufacturer would likely be willing to pay more to be listed first on the breast feeding document level node, than on the pregnancy document level node. An end-user accessing documents related to breast feeding is more likely to be in the market for a breast pump than any given end-user accessing pregnancy, in the mind of the advertiser. Thus, the user desiring advertising has bid more to achieve the first position in that breast feeding document level. If the user is not happy with the rank and prices, the user may edit the listings.

Also, the advertisement system may obtain and store information on an advertiser attempting to place an ad on the system. FIG. 11 is a screenshot representing an embodiment of a graphical interface enabling an advertiser to take the "provide contact information" step 1100 of listing an advertisement on level nodes according to the present invention. This contact information may include any or none of the following information relating to the user desiring advertising: first name 1110, last name 1120, company name 1130, street address 1140, city 1150, state 1160, zip code 1170, country 1180, email address 1190, phone number 1115, fax number 1125, and industry 1135. In alternate embodiments any number of other pieces of information regarding the user desiring advertising may be requested in this step. The advertisement system may use this information to contact an advertiser when there is an ad listing's rank has been changed. Alternatively, the advertisement system may periodically update an advertiser on the status of a listing.

Similarly, the advertisement system may allow an advertiser to store a means of payment or other such billing information, as a means for the advertisement system to receive payment. FIG. 12 is a screenshot representing an embodiment of a graphical user interface enabling an advertiser to take the "provide billing information" step 1200 of listing an advertisement on level nodes according to the present invention. In the preferred embodiment, the user desiring advertising may enter a credit card or other financial account number 1210 that would enable automatic periodic billing by the system. In other embodiments, the system may periodically generate physical invoices which are mailed to the advertiser. FIG. 12 also shows an option where the user may choose to enable "account auto replenish" 1220. This feature allows the system to charge the user before any advertising expenses are actually incurred. The system charges a preset amount 1230 to the user's billing card whenever the user's account balance falls to a certain amount 1240. In this step, the user may also input their billing address 1250.

Moreover, the advertisement system may enable an advertiser to view and edit, if desired, any information thus far sent to the advertisement system. Accordingly, FIG. 13 is a screenshot representing an embodiment of a graphical user interface enabling an advertiser to take the step of "registering an account" 1300 in order to list an advertisement on level nodes according to the present invention. This step may be the advertiser's final opportunity to make changes to the listings 1310, contact information 1320, or billing information 1330. Once the advertiser takes this step and registers the listings, the advertisements are then placed according to their node structure on the appropriate document level listings.

It should be appreciated that the advertiser may place multiple advertisements, may similar or identical advertisements on many different nodes within the system and may thus be provided the opportunity to run analyses to determine the most cost-effective advertising combination within the multi-node hierarchical system. It may be found, for example, that a $0.10 per click-through bid at channel level node and a $0.50 bid on one specific document level node produces the most hits to the advertisements and/or the most revenue from the hits.

Figure 14:
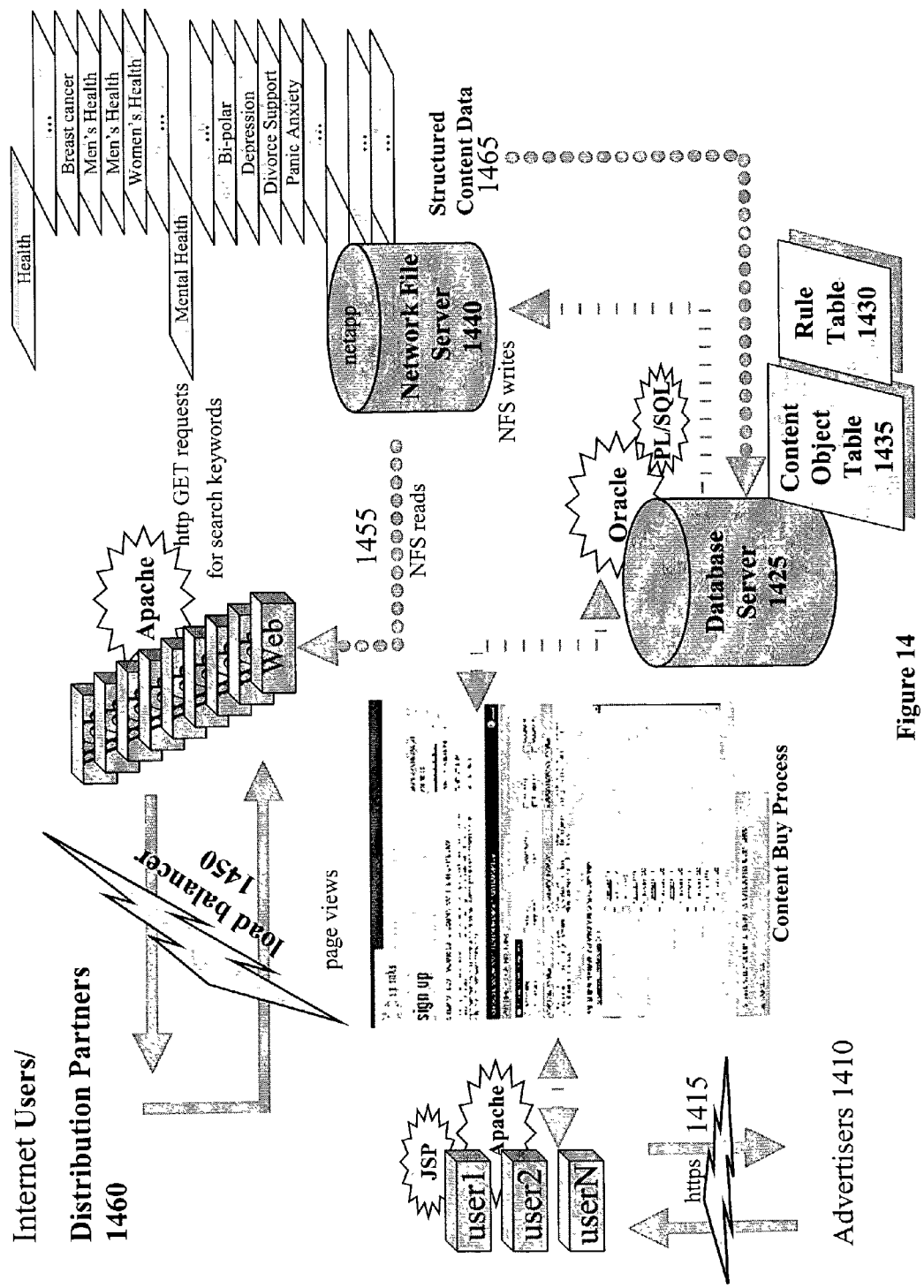
FIG. 14 is a schematic diagram representing a system whereby an advertiser might list advertisements in subject matter specific nodes within a structure of subject matter specific nodes according to an embodiment of the present invention.

To appreciate how the advertisements thus placed may be distributed, FIG. 14 is provided. FIG. 14 is a schematic diagram representing an advertisement system whereby an advertiser is enabled to list ads on content specific pages according to varying levels of subject matter specificity, such as through the various embodiments depicted in FIGS. 2-13. Multiple advertiser systems 1410 may connect to the Internet via an http connection 1415 and access the advertisement system. The http connection 1415 may be a secure one (https), if desired, although other security measures may also be utilized, such as described above. An advertiser system 1410 may access a database 1465 of content specificity via a database server 1425. Database server 1425 may provide software operations to interactively provide the graphical user interfaces presented in the example embodiments of FIGS. 2-13, receive content from those graphical user interfaces, store the content into the database and then provide subsequent error messages, or appropriate confirmation messages. The database server may also sequence the pages to the user based on a predetermined relationship between the graphical user interface pages shown. One example of how this may be accomplished is through the database server reading and writing to a Content Object Table Database 1435 where advertisements associated with content may be stored. Furthermore, the database server 1425 may enable the advertiser to read the Rule Table Database 1430, which may provide artificial system limitations regarding the listing of advertisements. These artificial system limitations may be rules designed to generate the highest profitability from a business standpoint. For example, based on the user's advertisement and subject matter, the system may recommend an advertising combination to maximize their advertising effectiveness. It should be appreciated that although a single network file server, database server, content object table and rule table are depicted in FIG. 14, multiple such object may be provided for purposes of scalability and optimization of the operations of this system.

When an advertiser system 1410 offers an amount for an ad listing, that offer may be stored in the Content Object Table Database 1435. Periodically, the Network File Server 1440 accesses the ads stored in the Content Object Table Database 1435 via the Database Server 1425 and writes them to the Structured Content Database 1465.

Additionally, multiple end users 1445 may connect via the Internet to various distribution partners to the multi-node hierarchical content-based system's content. For example, the multi-node hierarchical content-based system may be presented as a web site, such as the assignee of the present invention, About.com at www.about.com. Also, various partners of the host system may engage the host for purposes of providing some or all of the content on their web sites. For example, a web site about Women's issues may desire to distribute the subject level node(s) related to women's issues. The advertisements associated with those nodes may then be delivered along with the content for those nodes through the distribution partner to the end user over the Internet.

A load balancer 1450 may monitor the multiple internet connections, including requests to the server from one or more distribution partners. Via a web server, these multiple users may look for the content from the multi-node hierarchical content-based system. These multiple users 1445 may look for documents using the hierarchical node structure or by inputting search key words. In either case, the Network file server 1440 may read these requests 1455 and provide pages with related content along with the listings associated with that document. Thus the advertisement system illustrated in FIG. 14 enables an advertiser to offer an amount for ad placement on one content specific node, different from the amount offered for placement on another content specific node less likely to generate sales.

Once the advertisement system has accepted offers for placement of ads on a particular node, the advertisement system may publish those ads to the content specific node. For example, those ad listings may be published to a website, as mentioned above. For example, a document-level node may contain a single web page with informational content, links, graphics, chat, and other features related to the subject level, channel level and top level. Within that web page, some or all of the advertisers who placed ads for that level of specificity may be displayed. FIG. 15 is a screenshot representing a single document-level node web page related to a document level node. That web page may be provided with the highest three bidders for that document-level, including the highest bidders for the higher-level nodes. Therefore, for example, is one advertiser bids $0.25 for its advertisement to be placed within the channel level, then its rank for every web page displayed within that channel would be determined based on a bid of $0.25, unless it has a higher (or lower) bid for a specific page within that structure.

The URL for the document level node may be displayed at URL section 1510. This URL may be unique for each content based node, and may also be represented in a relational directory format. In the example shown in FIG. 15, the viewer has selected the Parenting & Family channel level node 1520, the Pregnancy & Birth subject matter level node 1530, and the Breastfeeding document level node 1540. As a result, the viewer has received content 1550 on the subject matter of the document level node selected, in this case, an article entitled "The Benefits of Breastfeeding Your Children."

In addition to receiving the content 1550 on the subject matter of the document level node, the viewer has also received three ad listings, 1570, 1580 and 1590. An advertiser who wishes to sell B-P pumps has bid the highest amount for placement on this node. Therefore, that advertiser's listing is listed first. The ad listing may include a Title 1555, "B-P breast pumps for sale"; a Description 1560, "Purchase now . . . limited time offer on B-P breast pumps"; and a Display URL 1565, "www.b-p.com\modelB." The display URL may show the viewer where they will be redirected if they click on the ad listing. In this example, the advertiser wishing to sell B-P breast pumps may have offered 12 cents per click-through for placement on this node. Whereas, the ad listings in positions 2 and 3, 1580 and 1590 have offered less. While the advertiser of B-P breast pumps may be willing to offer more for number one placement on this particular node because the viewers are likely to become customers, the advertiser may desire placement on tangentially related nodes and not be willing to offer an amount as high for that placement.

For example, with the present invention the same advertiser may offer to place the same ad listing on a node with content related to getting pregnant for a smaller amount than he offered for listing on the node with content related to breastfeeding. FIG. 16 is a screenshot representing advertisements listed in a subject matter specific node related to getting pregnant within a structure of subject matter specific nodes according to the present invention. The URL where the ads are published may be shown at 1610. This URL may be unique for each content based node, and may also be represented in a relational directory format. In the example shown in FIG. 16, the viewer has selected the Parenting & Family channel level node 1620, the Pregnancy & Birth subject matter level node 1630, and the Getting Pregnant document level node 1640. As a result, the viewer has received content 1650 on the subject matter of the document level node selected, in this case, an ovulation calendar.

In addition to receiving the content 1650 on the subject matter of getting pregnant, the viewer has also received three ad listings, 1670, 1680 and 1690. The advertiser who wishes to sell B-P pumps has bid three cents per click-through for placement on this node. Three cents per click-through is not the highest amount offered for placement on this node. Therefore, the B-P breast pump listing 1690 is not listed first. The ad listings in positions 1 and 2, 1670 and 1680 have offered less.

Thus, the advertisement system has enabled an advertiser to offer an amount for placing an advertisement on pages with certain content, which may be different from an amount offered for placing the same advertisement on pages with other subject matter content. This allows an advertiser to spend their advertising money on being seen by the viewers who are most likely to become purchasers. This is advantageous to the advertiser because it will allow diversification of advertising and more appropriate pricing. The advertisement system will allow more advertisers to have the highest rank on the pages that are most relevant to their sales. Therefore, the ads will be seen by more potential buyers, and less likely to be seen by viewers uninterested in the goods and services being advertised, and thus the advertisement system of the present invention may offer higher sales for the advertiser for the same amount of money spent on advertising with pre-existing systems.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by the following claims and their legal equivalents.

What is claimed is:

1. An Internet advertising system comprising:
   a bid receiving device for sending a multi-level representation of at least a portion of a hierarchy of content nodes to a plurality of advertiser user systems to facilitate user selection of one or more of the nodes for an advertisement listing, the hierarchy of content nodes providing a categorization of information and each content node being associated with one or more web pages, and receiving a first bid amount and a second bid amount associated with an advertisement listing that includes a title and a target location, the first bid amount for a first content node and the second bid amount for a second content node within the hierarchy of content nodes;
   computer memory for storing the first bid and the second bid for the advertisement listing; and
   advertisement server means for serving an electronic advertisement based on the advertisement listing for placement on a web page of the first content node based on the first bid amount.

2. The Internet advertising system of claim 1 further comprising receiving means for receiving advertisement listing information from a plurality of advertiser users over a network comprising the Internet, the advertisement listing information comprising a title and a target location.

3. The Internet advertising system of claim 1 further comprising an advertisement ranking means for ranking advertisements based on a monetary value associated with the topic.

4. The Internet advertising system of claim 1 further comprising a monetary determination means for determining a monetary value to be charged to an entity associated with the electronic advertisement, the monetary value being based on the first bid amount.

5. The Internet advertising system of claim 1, wherein a category of the first content node is broader than a category of the second content node.

6. The Internet advertising system of claim 1, wherein the advertisement server means further serves the electronic advertisement for placement on a web page of the second content node based on the second bid amount.

7. The Internet advertising system of claim 6, wherein the advertisement server means identifies a position from a number of selectable positions on the web page of the first content node for placement of the electronic advertisement based on the first bid amount, and identifies a position from a number of selectable positions on the web page of the second content node based on the second bid amount.

8. The Internet advertising system of claim 6, wherein:
   serving an electronic advertisement based on the advertisement listing for placement on a web page of the first content node comprises serving the electronic advertisement for delivery along with web page content through a first distribution partner to an end user over the Internet; and
   serving an electronic advertisement based on the advertisement listing for placement on a web page of the second content node comprises serving the electronic advertisement for delivery along with web page content through a second distribution partner to an end user over the Internet.

9. The Internet advertising system of claim 1, wherein:
   serving an electronic advertisement based on the advertisement listing for placement on a web page of the first content node comprises serving the electronic advertisement for delivery along with web page content through a first distribution partner to an end user over the Internet.

10. The Internet advertising system of claim 1, wherein a lowest level in the hierarchy of content nodes comprises a plurality of document level content nodes each comprising a single web page.

11. The Internet advertising system of claim 10, wherein an uppermost level in the hierarchy of content nodes comprises a plurality of language level nodes each language level node comprising a group of web pages with content written in a given language, each language level node corresponding to a different language.

12. The Internet advertising system of claim 1, wherein the first content node comprises a plurality of web pages from different web sites, and the advertisement server means serves the electronic advertisement for placement on the web pages of the first content node based on the first bid amount.

13. The system of claim 1, wherein the representation of the content node hierarchy comprises at least three levels.

14. An Internet advertising system comprising:
   a bid input server configured to send a multi-level representation of at least a portion of a hierarchy of content nodes to a plurality of advertiser user systems to facilitate user selection of one or more of the nodes for an advertisement listing, the hierarchy of content nodes providing a categorization of information and each content node being associated with one or more web pages, and receive a first bid amount and a second bid amount associated with an advertisement listing that includes a title and a target location, the first bid amount for a first content node and the second bid amount for a second content node within the hierarchy of content nodes; and
   an advertisement server configured to serve an electronic advertisement based on the advertisement listing for placement on a web page of the first content node based on the first bid amount.

15. The Internet advertising system of claim 14 further comprising an advertisement input module that receives advertisement listing information from a plurality of advertiser users over a network comprising the Internet, the advertisement listing information comprising a title and a target location.

16. The Internet advertising system of claim 14 further comprising an advertisement ranking module that ranks advertisements based on a monetary value associated with the topic.

17. The Internet advertising system of claim 14 further comprising a monetary determination module that determines a monetary value to be charged to an entity associated with the electronic advertisement, the monetary value being based on the first bid amount.

18. The Internet advertising system of claim 14, wherein the first content node comprises a plurality of web pages from different web sites, and the advertisement server serves the electronic advertisement for placement on the web pages of the first content node based on the first bid amount.

19. The system of claim 14, wherein the representation of the content node hierarchy comprises at least three levels.

20. An Internet advertising method, the method implemented by a server system and comprising:
sending, through a communication interface, a multi-level representation of at least a portion of a hierarchy of content nodes to a plurality of advertiser user systems to facilitate user selection of one or more of the nodes for an advertisement listing, the hierarchy of content nodes providing a categorization of information and each content node being associated with one or more web pages;
receiving, through a communication interface, a first bid amount and a second bid amount associated with an advertisement listing that includes a title and a target location, the first bid amount for a first content node and the second bid amount for a second content node within the hierarchy of content nodes; and
selecting, using one or more data processors, an electronic advertisement from a database of electronic advertisements based on the advertisement listing for placement on a web page of the first content node based on the first bid amount.

21. The Internet advertising method of claim 20 further comprising receiving advertisement listing information from a plurality of advertiser users over a network comprising the Internet, the advertisement listing information comprising a title and a target location;

22. The Internet advertising method of claim 20 further comprising ranking advertisements based on a monetary value associated with the topic.

23. The Internet advertising method of claim 20 further comprising determining a monetary value to be charged to an entity associated with the electronic advertisement, the monetary value being based on the first bid amount.

24. The Internet advertising method of claim 20, wherein the first content node comprises a plurality of web pages from different web sites, and further comprising serving the electronic advertisement for placement on the web pages of the first content node based on the first bid amount.

25. The method of claim 20, wherein:
the communication interface is part of a first server; and
at least one of the data processors is part of a second server.

26. The method of claim 20, wherein the representation of the content node hierarchy comprises at least three levels.

27. An Internet advertising system comprising:
a content database adapted to provide a hierarchy of content nodes, the hierarchy of content nodes providing a categorization of information and including a first content node and a second content node, each content node being associated with one or more web pages;
a bid input server adapted to send a multi-level representation of at least a portion of the hierarchy of content nodes to a plurality of advertiser user systems to facilitate user selection of one or more of the nodes for an advertisement listing and receive a first bid and a second bid both being associated with an advertisement listing, the advertisement listing including a title and a target location, the first bid for the first content node and the second bid for the second content node, the first bid and the second bid being associated with a single advertiser; and
an advertisement server adapted to serve an electronic advertisement based on the advertisement listing for placement on a web page of the first content node based on the first bid amount.

28. The Internet advertising system of claim 27, wherein the first bid and the second bid are received from an advertiser.

29. The Internet advertising system of claim 27, wherein the first content node comprises a plurality of web pages from different web sites, and the advertisement server serves the electronic advertisement for placement on the web pages of the first content node based on the first bid amount.

30. The system of claim 27, wherein the representation of the content node hierarchy comprises at least three levels.

31. A method, the method implemented by a server system and comprising:
generating, using one or more data processors, a hierarchy of content nodes, each content node of the hierarchy having a category in the hierarchy and being associated with one or more web pages identified as having content related to the category;
sending, through a communication interface, a multi-level representation of at least a portion of a hierarchy of content nodes to a plurality of advertiser user systems to facilitate user selection of one or more of the nodes for an advertisement listing;
receiving, through the communication interface, a first bid for a first content node and a second bid for a second content node, both the first bid and the second bid being associated with an advertisement listing, the advertising listing including a title and a target location, both the first bid and the second bid being associated with a single advertiser; and
sending through the communication interface an instruction directing an advertisement server to serve an electronic advertisement based on the advertisement listing for placement on a web page of the first content node based on the first bid.

32. The method of claim 31, wherein the first content node comprises a plurality of web pages from different web sites, and further transmitting instructions directing the advertisement server to serve the electronic advertisement for placement on the web pages of the first content node based on the first bid amount.

33. The method of claim 31, wherein:
at least one of the data processors is part of a first server; and
the communication interface is part of a second server.

34. The method of claim 31, wherein the representation of the content node hierarchy comprises at least three levels.

* * * * *

UNITED STATES PATENT AND TRADEMARK OFFICE
CERTIFICATE OF CORRECTION

| | | |
|---|---|---|
| PATENT NO. | : 7,752,072 B2 | Page 1 of 1 |
| APPLICATION NO. | : 10/309332 | |
| DATED | : July 6, 2010 | |
| INVENTOR(S) | : Barry et al. | |

It is certified that error appears in the above-identified patent and that said Letters Patent is hereby corrected as shown below:

Column 15, line 30, in claim 21, delete "location;" and insert -- location. --.

Signed and Sealed this
Twenty-eighth Day of December, 2010

David J. Kappos
*Director of the United States Patent and Trademark Office*